May 24, 1927.
M. GROSS
TIRE RIM
Filed Nov. 5, 1925
1,629,913
2 Sheets-Sheet 2
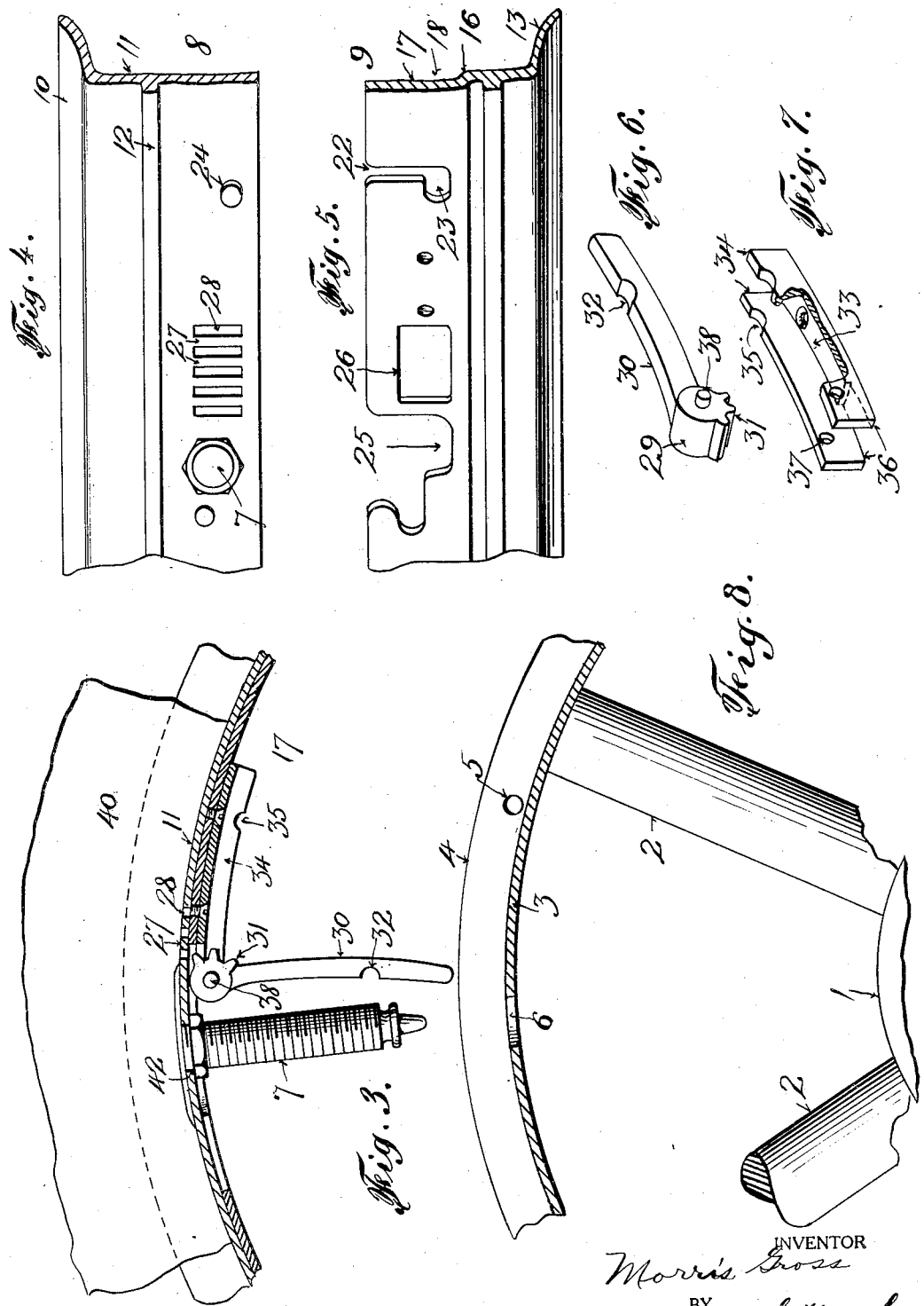
INVENTOR
Morris Gross
BY Charles G. Hensley
ATTORNEY Patented May 24, 1927.

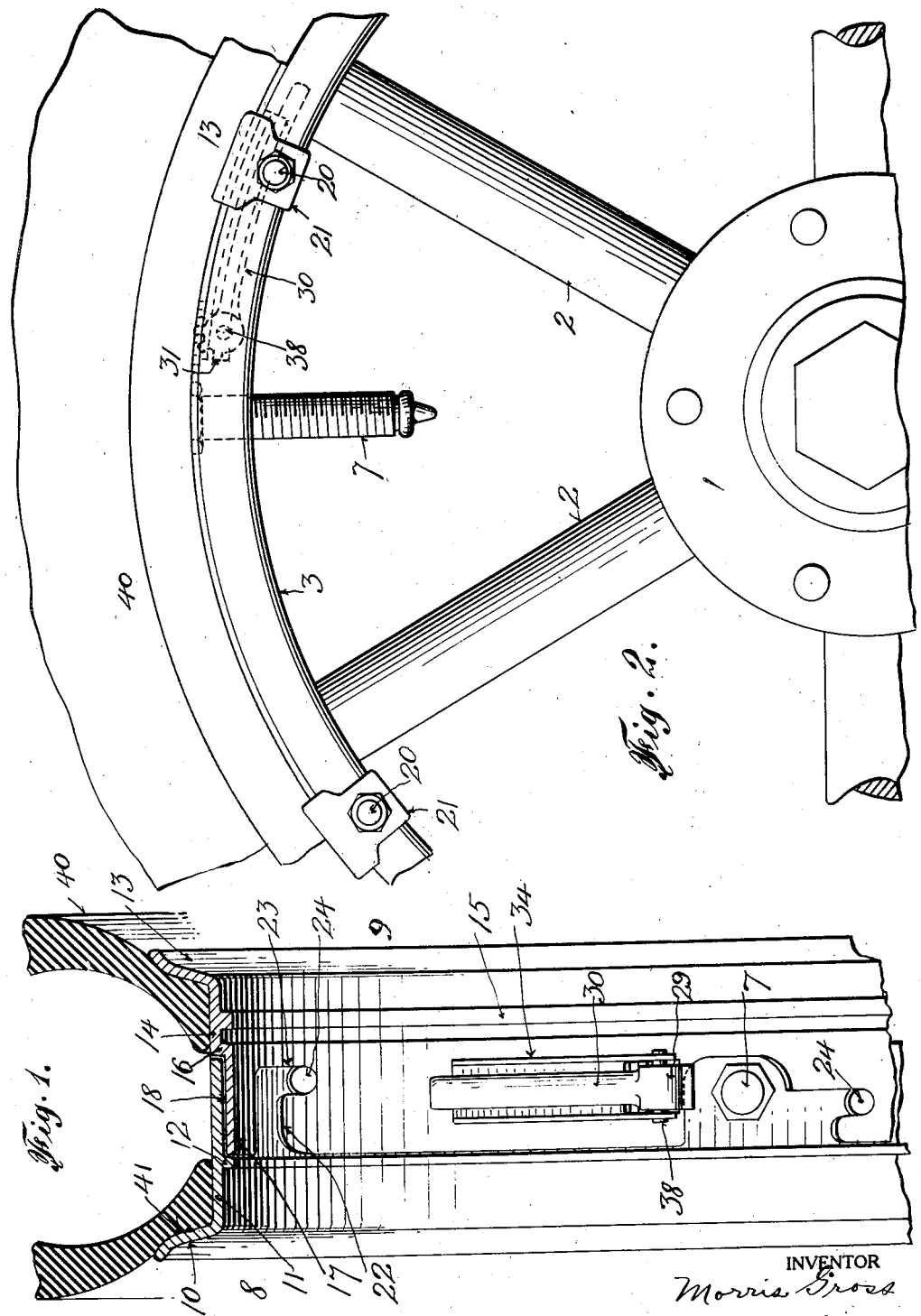

1,629,913

UNITED STATES PATENT OFFICE.

MORRIS GROSS, OF NEW YORK, N. Y.

TIRE RIM.

Application filed November 5, 1925. Serial No. 67,034.

My invention relates to the metal rims attached to tires for vehicles, especially to the pneumatic tires used on automobiles. The pneumatic tire is generally equipped with a metal rim which remains as a part of the tire structure when the tire is being carried on the vehicle as a spare, and when the tire is to be applied to the wheel the rim is slipped over the wheel structure and clamped in place. The object of this invention is to provide a metal rim for the tire which may be handled as part of the tire structure as distinguished from the wheel structure so that the tire with my improved rim may be carried as a spare and may be attached to the wheel at any time. The improved rim embodies two annular rings adapted to be clamped together by moving them sidewise in relation to each other in such relation as to engage the inner portion of the tire between them. These two annular members are provided with pin and slot or bayonet joint connections which are adapted to be interlocked with each other and to be disengaged by a circular shifting movement of one annular member in relation to the other in order to engage or release the pin and slot connections, and I have provided simple and efficient means for causing this relative circular motion of the annular members in order to control the locking and unlocking thereof. The features of my invention, therefore, relate to the construction of these annular members and means for locking and unlocking them.

In the drawings forming part of this application,

Figure 1 is a cross sectional view of a portion of a pneumatic tire having my improved rim applied thereto, Figure 2 is a side elevation of a portion of a wheel structure to which my invention has been applied, Figure 3 is a longitudinal sectional view of a portion of a wheel and tire structure showing the parts separated and with the locking device in the released position, Figures 4 and 5 are face views looking at the inner surface of the annular rim members, Figure 6 is a perspective view of the lever and gear for locking and unlocking the annular members, and Figure 7 is a perspective view of the bracket on which the lever is mounted.

Fig. 8 is a fragmentary view of the wheel, showing a portion of the felly in section.

In the drawing I have shown one form of wheel structure comprising the central or hub portion 1 from which radiate the spokes 2 and on the outer ends of the spokes there is the usual form of metal felloe 3. While the wheel structure forms no part of the present invention, and while my invention may be applied to various types of wheels, I have chosen to illustrate the form now in general use. The wheel rim or felloe 3 is provided with an aperture 6 to receive the valve stem 7 of the tire, and it is provided with bolt apertures 5 extending through the side flange 4 of the wheel rim through which the bolts 20 are adapted to be passed for the purpose of attaching the tire clamps 21 against one face of the tire rim.

I have shown a portion of a pneumatic tire shoe 40 and it will be understood that the usual inner tube will be disposed inside of this shoe and will carry the valve stem 7 which projects inwardly through the tire rim.

The tire rim is composed principally of two annular members. One of these is the member 8 which forms a complete annular ring which will neither expand nor contract circumferentially and which will therefore be more rigid and permanent than the collapsible type of rim. This member has a side flange 10 which is adapted to seat against the edge 41 of the tire shoe 40 and the horizontal wall 11 extends across the inner edge of the shoe, the width of this wall preferably being somewhat greater than one-half the width of the base of the tire. I prefer to provide an integral inwardly extending flange 12 projecting from the base 11 to act as a rest to co-operate with the periphery of the wheel rim. The second rim member comprises the annular member 9 which is also a complete annular ring and it has an outwardly extending flange 13 which is adapted to bear against one side of the inner portion of the tire shoe, and it also comprises base 14 which engages the inner edge of the tire shoe. This base wall, in the preferred construction, is provided with an offset portion or channel defined by the inwardly extending portion 16 and by the horizontally disposed portion 17 which latter is disposed slightly offset from the portion 14. This forms a pocket 18 in the outer surface of the rim member 9 open at one side to receive the horizontal portion 11 of the rim member 8. It will be observed that when the rim members are moved laterally toward each other into the position shown in Figure 1, the horizontal portion 11 of the rim member 8 will be received in the pocket formed by the offset portion of the member 9, so that the outer surfaces of these rim members will lie flush and present a smooth, unobstructed surface for the tire.

When the rim members are in this assembled position the inner edge of the flange 12 will lie flush with or slightly below the portion 17 of the rim member 9 in order to take the bearing pressure upon the wheel structure. I preferably provide a corresponding inwardly extending flange 15 on the rim member 9 which will seat against one edge of the wheel structure and act as a bearing member.

One of the rim members is provided with suitable slots and the other with suitable pins to lock therewith, and it is immaterial which member carries the pins and which is supplied with the slots. In the drawings I have shown the rim member 8 provided with the locking pins 24 extending inwardly from the inner surface and these will be arranged at intervals around the entire rim. The rim member 9 is provided at intervals with slots 22 opening inwardly from one edge and these slots turn substantially at right angles at 23 to form what is generally called a bayonet slot. The valve stem 7 of the tire is adapted to be passed through or fitted within an aperture 42 in the rim member 8 and the rim member 9 is provided with a slot or cut-out 25 to permit the valve stem to be received sidewise therein and to move circumferentially of the rim member corresponding with the circumferential movement of the pins 24 in the bayonet slots. It will be apparent that when the rim members are brought against opposite sides of the base of the tire and moved into overlapping position, the pins 24 must at that time register with the portions 22 of the bayonet slots and the valve stem 7 must register with a portion of the cut-out 25. With the parts in this registering position, the rim members are moved into overlapping position as shown in Figure 1, and then a relatively circumferential movement takes place between the rim members in order to bring the pins 24 within the portions 23 of the bayonet slots, whereupon the rim members will be securely locked together with the tire shoe.

I have shown an arched shaped bracket 33 secured to the wall 17 of the rim member 9 so that the vertical walls 34 of this bracket extend inwardly from the rim member. This bracket may be riveted or welded to the rim member, or it may be screwed thereto as shown in the drawings, the particular method of attachment being subject to change. The projecting ends 36 of this bracket are provided with registering apertures 37 through which projects the pin 38 on which the operating lever is pivoted. This lever, consisting of the arm 30, is adapted to be manipulated by hand, and there is a small gear 29 having teeth 31 adapted to engage with a rack formed by cutting short slots 28 in the base 11 of the rim member 8 to form rack teeth 27. Preferably the bracket is provided with recesses or grooves 35 and the handle 30 is provided with a similar groove 32 to register with the former grooves when the handle is in closed position, so that one of the wheel clamping bolts 20, when applied to the wheel, to secure the tire structure thereon, will pass through these registering grooves and serve, not only to hold the lever handle in closed position, but also to prevent the tire structure as a whole from traveling or creeping around the wheel structure.

When the operating lever 30 is in the position shown in Figure 3 the teeth of the gear 29 will be disengaged from the rack teeth 27 and the rim members are moved laterally into overlapping position in the operation of applying the rim to the tire while the operating lever is in this position so that the teeth of the gear will not interfere with the overlapping of the rim members. After the rim members have been placed in overlapping position the handle 30 is moved counterclockwise in Figure 3 so that the teeth of the gear engage the rack teeth 27 and in the operation of swinging the lever into the closed position shown in Figures 1 and 2 the gear and rack compel the rim members 8, 9 to move circumferentially in reverse directions sufficiently to cause the pins 24 to move to the position shown in Figure 1 in the bayonet slots. After the lever has been moved to closed position the tire structure as a whole may be applied to the wheel structure by first moving the portion containing the valve stem 7 in place with the stem projecting through the wheel aperture 6, whereupon the remaining portion of the tire structure may be moved laterally over the remaining portion of the wheel rim. When the clamping bolt 20 is inserted through the aperture 5 of the wheel rim it will pass through the groove 35, 32 of the bracket and lever, and it will prevent the lever from moving out of locked position. While the rims are in locked position upon the wheel the teeth of the gear remain engaged with the rack teeth 27, and this assists in preventing the rim members from moving apart laterally although the various pins 24 serve to hold the rim members in fixed lateral relation. The gear is adapted to move through the aperture 26 in the wall 17 in order to reach the rack teeth 27. In order to disassemble the tire rim the wheel clamps 21 are first removed and the tire and its rim are then forced laterally from the wheel rim at the side opposite the valve stem, and then lifted off the wheel to remove the stem through the aperture 6. When the tire structure has been removed from the wheel the lever 30 may be moved clockwise into the position shown in Figure 3, and this movement will cause the gear and rack to shift the rim members circumferentially in reverse directions and bring the pins 24 into the lateral portions 22 of the bayonet slots so that the tire rim members may be moved laterally apart to disengage them from each other and from the tire.

Having described my invention, what I claim is:

A detachable tire rim comprising a plurality of annular members adapted to be moved laterally into overlapping position to engage a portion of the tire between them, said members having pin and slot connections to secure them together laterally, and means for causing a relative circumferential movement of said annular rim members comprising a rocking gear having a lever arm for operating it, and carried by one of said rim members, and rack teeth on the other of said rim members with which the gear co-operates to force the rim members circumferentially in opposite directions.

Signed at the city, county and State of New York, this 5th day of October, 1925.

MORRIS GROSS.